United States Patent [19]
Kuisma

[11] Patent Number: 4,628,403
[45] Date of Patent: Dec. 9, 1986

[54] CAPACITIVE DETECTOR FOR ABSOLUTE PRESSURE

[75] Inventor: Heikki T. Kuisma, Helsinki, Finland

[73] Assignee: Vaisala Oy, Helsinki, Finland

[21] Appl. No.: 701,857

[22] Filed: Feb. 15, 1985

[30] Foreign Application Priority Data

Feb. 21, 1984 [FI] Finland .................................. 840699

[51] Int. Cl.[4] .......................... G01L 9/12; H01G 5/16
[52] U.S. Cl. ........................................ 361/283; 73/718
[58] Field of Search .................... 73/718, 724; 361/283

[56] References Cited

U.S. PATENT DOCUMENTS

| | | | |
|---|---|---|---|
| 4,158,217 | 6/1979 | Bell | 73/718 X |
| 4,257,274 | 3/1981 | Shimada et al. | 73/718 |
| 4,390,925 | 6/1983 | Freud | 73/718 X |

Primary Examiner—Donald A. Griffin
Attorney, Agent, or Firm—Birch, Stewart, Kolasch & Birch

[57] ABSTRACT

A capacitive detector for absolute pressure, which comprises a base and a stationary capacitor plate (7) attached onto the base (3). An aneroid capsule (4) is arranged in connection with the base (3) and provided with a mobile capacitor plate area (5, 6) directed towards the base (3) and changing its distance from the stationary capacitor plate (7) by the effect of pressure. A silicon plate (2) is attached onto the base and has membrane-like middle portion (5, 6) acting as a mobile capacitor plate. A plate structure (1) is attached hermetically onto the silicon plate (2) such that the space of the aneroid capsule (4) is located between the plate structure (1) and the silicon plate (2).

8 Claims, 6 Drawing Figures

CAPACITIVE DETECTOR FOR ABSOLUTE PRESSURE

The present invention is concerned with a capacitive detector for measuring the absolute pressure of a medium.

In a capacitive pressure detector, the difference in pressure causes a deflection of an elastic membrane and changes the distance of a capacitor plate attached to the membrane from a stationary capacitor plate attached to the frame of the apparatus or from a mobile plate attached to a second membrane. The movement can be connected to the plates either so that an increase in pressure spares the plates further from each other or so that the increase brings the plates closer to each other.

If the distance of movement of the plate is proportional to the pressure, the sensitivity to pressure of the capacitance of the detector is higher at a pressure at which the plates are closer to each other as compared with a pressure at which they are more distant from each other. This circumstance has been made use of in pressure detectors operating within a wide range of pressure by arranging that the plates are closest to each other at a low pressure and become more distant from each other when the pressure increases.

FIGS. 1 and 2 show prior-art embodiments of such a pressure detector construction. In FIG. 1, the capacitor plates are placed outside the aneroid capsule, in FIG. 2 inside the capsule.

In respect of the prior-art technology, reference should be made to the following publications:

[1] K. E. Bean, "Anisotropic Etching of Silicon", *IEEE Transactions of Electron Devices*, Vol. ED-25 (1978) No. 10 pp. 1185-93.
[2] U.S. Pat. No. 4,386,453 (Giachino et al.)
[3] U.S. Pat. No. 4,257,274 (Shimada et al.)
[4] U.S. Pat. No. 4,332,000 (Petersen)
[5] U.S. Pat. No. 4,390,925 (Freud)
[6] U.S. Pat. No. 3,397,278 (Pomerantz)

As is well known, miniaturized capacitive pressure detectors may also be made of silicon and glass by making use of micro-photolithography and etching method (cited paper [1]). In the cited paper [2], a detector for absolute pressure is described in which the capacitor plates are placed inside the aneroid capsule and approach each other when the pressure increases.

It is an object of the present invention to provide a detector for absolute pressure which, being accomplished by means of the manufacturing technique described in the cited papers [1] to [6], operates in the way of the constructions shown in FIGS. 1 and 2.

According to the invention, this advantageous construction can be achieved by means of a detector which is made as follows:

it comprises two glass plates and of a silicon plate fitted between them,
the silicon and glass plates have been processed so that on one side of the silicon plate an aneroid capsule is formed, and on the other side an air-insulated capacitor,
one of the glass plates carries a stationary capacitor plate,
the other glass plate closes the aneroid capsule, and
the silicon plate is provided with a membrane-like thinner area, which is deflected by the effect of pressure and to which the mobile capacitor plate is connected.

More specifically, the detector in accordance with the invention includes a channel in the silicon plate which receives a conductor electrically connecting a terminal with the stationary capacitor plate.

By means of the invention, remarkable advantages are obtained. Thus, as compared with the construction of the cited paper [2],
a higher sensitivity is obtained at low pressures,
the volume of the aneroid capsule is larger (the distance between the capacitor plates is typically about 1/100 of the depth of the basin),
no passing of conductors out of the vacuum capsule is required.
On the other hand, which is achieved as compared with the conventional constructions of FIGS. 1 and 2 is:
small size,
more stable materials,
rapid response,
little internal differences in temperature, and
suitability for mass production.

The invention will be examined in the following in more detail with the aid of the exemplifying embodiments in accordance with the attached drawing FIGS. 3 to 5.

Figure 1:
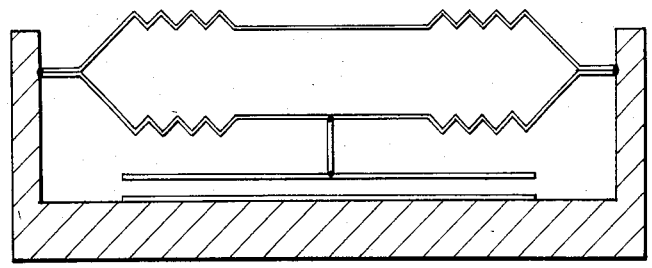
Figure 2:
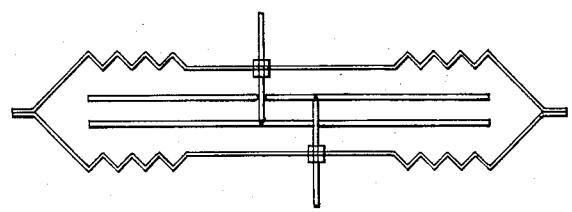
Figure 3A:
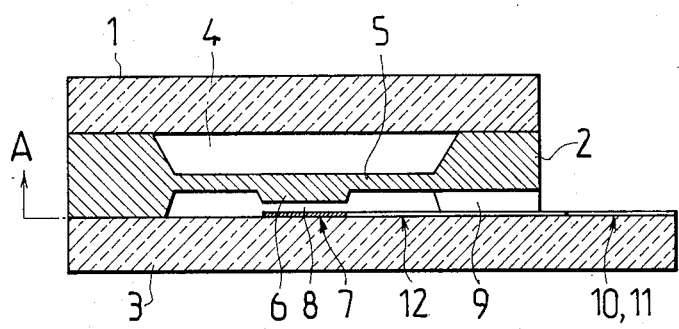
FIG. 3a is a sectional side view of a detector in accordance with the invention.
Figure 3B:
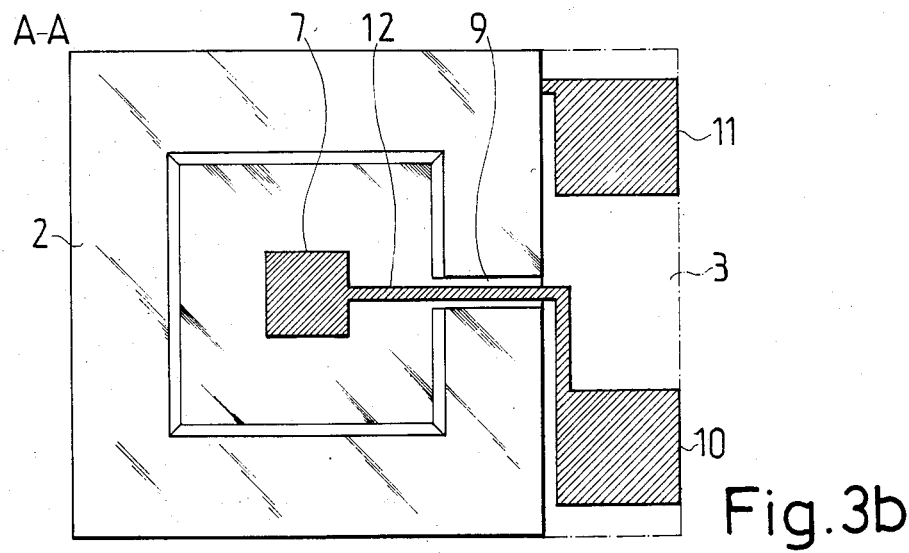
FIG. 3b shows the detector shown in FIG. 3a as a section along the plane A—A.

When a detector for absolute pressure with a wide range of pressure is to be manufactured, the movement of the plates must be made opposite to that described in the cited paper [2]. FIGS. 3a and 3b illustrate such a construction of a pressure detector. The detector comprises a glass plate 1, a silicon plate 2 and a glass plate 3. The components are joined together, e.g., by means of the method in accordance with the cited paper [6]. At one side, a basin 4 has been prepared by etching into the silicon plate 2, which basin has been covered by a glass plate 1 in a vacuum and closed hermetically. The basin 4 closed by means of the glass plate 1 constitutes the aneroid capsule of the pressure detector.

The other side of the silicon plate 2 has also been worked so that a membrane portion 5 with a thicker middle portion 6 has formed. The membrane portion 5 is sensitive to pressure, and the middle portion 6 acts as the mobile capacitor plate.

On the glass plate 3 there is a stationary capacitor plate 7, which has been formed by depositing a thin metal film onto the glass plate and by patterning the said film. The area 7 is electrically connected to the terminal 10 by means of a conductor 12. The other terminal 11 is in conductive contact with the silicon plate 2. The conductor 12 passes through a channel 9 machined into the silicon plate 2, along which channel the pressure to be measured can act upon the membrane 5. The areas 10, 11 and 12 are prepared in the same way as the area 7.

The capacitance sensitive to pressure is formed between the middle part 6 and the plate 7 across the air gap 8. It can be measured electrically across the terminals 10 and 11 or the conductors connected to them.

Typical dimensions of the detector are 4 mm×6 mm×2.5 mm. The thickness of the membrane 5 is 10 to 100 $\mu$m. The width of the air gap 8 is 1 to 10 $\mu$m. The area of the capacitor plates 6 and 7 is 1 to 10 mm².

Figure 4:
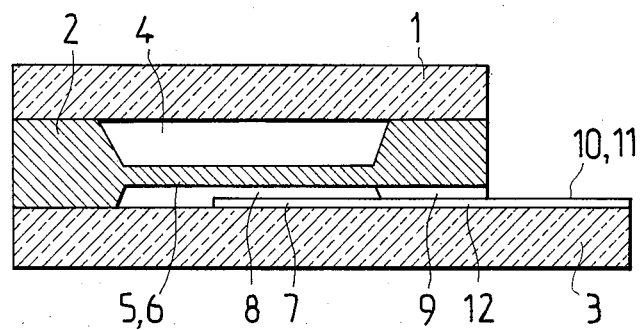
FIG. 4 is a sectional side view of a second detector in accordance with the invention.
Figure 5:
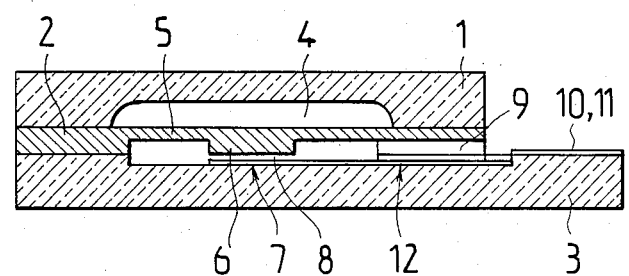
FIG. 5 is a sectional side view of a third detector in accordance with the invention.

In the alternative constructions shown in FIGS. 4 and 5, reference numerals analogical to those used in FIGS. 3a and 3b are used.

In the construction of FIG. 4, the rigid middle part 6 has been omitted, whereby the unified membrane part 5 functions as a capacitor plate.

FIG. 5 shows a modification of the construction of FIGS. 3a and 3b, in which modification the basin 4 of the aneroid capsule and the air gap 8 have been worked into the glass plates 1 and 3 instead of the silicon plate 2.

Within the scope of the invention, it is also possible to conceive other solutions differing from the exemplifying embodiments described above. Thus, for example, it is also possible either to work the basin 4 into the glass plate 1 and the air gap into the silicon plate 8, or the basin 4 into the silicon plate 2 and the air gap into the glass plate 3.

What is claimed is:

1. A capacitive detector for the measurement of the absolute pressure of a medium, which comprises:
   a first insulating plate functioning as a base;
   a stationary capacitor plate attached onto said first insulating plate;
   a silicon plate attached onto said first insulating plate and having a thin, membrane-like middle portion functioning as a mobile capacitor plate and defining a chamber between itself and said first insulating plate, and a channel allowing free entrance of the medium into said chamber;
   a second insultating plate attached hermetically onto said silicon plate so as to define an aneroid capsule between itself and said membrane-like middle portion, the distance of said membrane-like middle portion from said stationary capacitor plate being a function of the absolute pressure to be measured;
   a first terminal arranged outside said silicon plate in conductive contact therewith, and
   a second terminal arranged outside said silicon plate; and
   a conductor electrically connecting said second terminal with said stationary capacitor plate through said channel.

2. A detector as claimed in claim 1, wherein said first and the second plate structure are glass plates.

3. A detector as claimed in claim 1, wherein said membrane-like middle portion comprises a rigid central area.

4. A detector as claimed in claim 1, wherein said membrane-like middle portion is at least substantially of uniform thickness.

5. A detector as claimed in claim 1, wherein said space of the aneroid capsule is at least partly worked into the face of said silicon plate, which faces the second plate structure.

6. A detector as claimed in claim 1, wherein the space of the aneroid capsule is at least partly worked into the face of said second plate structure, which faces the silicon plate.

7. A detector as claimed in claim 1, wherein the air gap between the electrodes is at least partly worked into the face of said silicon plate, which faces the first plate structure.

8. A detector as claimed in claim 1, wherein the air gap between the electrodes is at least partly worked into the face of said first plate structure, which faces the silicon plate.

* * * * *